US008387352B2

(12) United States Patent
Silver et al.

(10) Patent No.: US 8,387,352 B2
(45) Date of Patent: Mar. 5, 2013

(54) CORNHEAD DIVIDER LIFT ASSIST LINKAGE

(75) Inventors: Dennis P. Silver, Geneseo, IL (US); Daniel M. Heim, Port Byron, IL (US); Michael L. Vandeven, Princeton, IA (US); Suresh Neela, Kurnool (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/112,250

(22) Filed: May 20, 2011

(65) Prior Publication Data

US 2012/0291410 A1 Nov. 22, 2012

(51) Int. Cl.
*A01D 63/00* (2006.01)
*A01D 65/00* (2006.01)

(52) U.S. Cl. .......................................... 56/319; 56/119
(58) Field of Classification Search .................... 56/319, 56/119, 109, 314, 15.2
See application file for complete search history.

(56) References Cited

U.S. PATENT DOCUMENTS

| | | | | |
|---|---|---|---|---|
| 1,697,474 A * | 1/1929 | Peters | | 56/314 |
| 3,349,549 A * | 10/1967 | Van Der Lely | | 56/10.2 R |
| 3,460,323 A * | 8/1969 | Schnaidt | | 56/15.7 |
| 3,885,377 A * | 5/1975 | Jones | | 56/314 |
| 3,967,439 A * | 7/1976 | Mott | | 56/314 |
| 4,446,682 A * | 5/1984 | Jennen et al. | | 56/119 |
| 4,493,181 A * | 1/1985 | Glendenning et al. | | 56/314 |
| 4,553,379 A * | 11/1985 | Kalverkamp | | 56/60 |
| 4,700,537 A * | 10/1987 | Emmert | | 56/314 |
| 4,757,673 A * | 7/1988 | Gayman | | 56/314 |
| 5,195,309 A * | 3/1993 | Mossman | | 56/119 |
| 5,865,019 A * | 2/1999 | Hurlburt et al. | | 56/119 |
| 6,116,010 A * | 9/2000 | Salley | | 56/257 |
| 6,247,297 B1 * | 6/2001 | Becker | | 56/119 |
| 6,513,313 B1 * | 2/2003 | Bennett | | 56/319 |
| 7,162,855 B2 * | 1/2007 | Boeckmann et al. | | 56/15.2 |
| 7,240,471 B2 * | 7/2007 | Mossman | | 56/119 |
| 7,350,345 B2 * | 4/2008 | Slabbinck et al. | | 56/119 |
| 7,395,651 B2 * | 7/2008 | Kost et al. | | 56/119 |
| 7,430,846 B2 * | 10/2008 | Bomleny et al. | | 56/10.2 E |
| 7,681,387 B2 * | 3/2010 | Guldenpfennig et al. | | 56/119 |
| 8,141,331 B2 * | 3/2012 | Bich et al. | | 56/15.2 |
| 2010/0083629 A1 * | 4/2010 | Klotzbach et al. | | 56/320.1 |

FOREIGN PATENT DOCUMENTS

| | | |
|---|---|---|
| EP | 0131853 | 1/1985 |
| EP | 0848898 | 6/1998 |
| EP | 1186223 | 3/2002 |
| FR | 2596609 | 10/1987 |

OTHER PUBLICATIONS

European Search Report, Aug. 28, 2012, 5 pages.

* cited by examiner

*Primary Examiner* — Árpád Fábián-Kovács

(57) ABSTRACT

A corn head divider lift assist linkage comprises two members and a spring pivotally coupled together, wherein one of the two members is pivotally coupled to a row crop divider and another of the two members is pivotally coupled to a bracket that is fixed at the rear of two adjacent row units.

9 Claims, 4 Drawing Sheets

CORNHEAD DIVIDER LIFT ASSIST LINKAGE

FIELD OF THE INVENTION

This invention relates to corn head. More particularly, it relates to corn head divider lift assist linkages.

BACKGROUND OF THE INVENTION

Cornheads are harvesting heads mounted on the front of agricultural combines. Cornheads pull down adjacent rows of corn plants and snap the ears of corn of the plants.

To do this, the rows of corn plants must be guided into narrow gaps in row units that extend across the width of the cornhead. This guidance is provided by lightweight plastic dividers, also known as points and covers, the term "points" referring to the forward portion of the divider, and the term "covers" referring to the rear portion of the divider that covers most of the workings of the row units. These dividers are pointed on their forward ends and direct the corn plants either to the left or right, and directly into the crop-receiving gaps of each row unit.

These dividers not only guide the rows of corn plants into the proper openings in the row units, they also cover substantially the entire row unit to keep plant stalks and other materials from falling into and jamming the row units.

In order to maintain the row units, the operator must lift the dividers out of the way. The dividers are typically hinged about a laterally extending and horizontal axis at the rear of the dividers to pivot upward and uncover the row units.

In a first prior art design (FIG. 1) a stick is used to prop the dividers in a raised position. The stick extends upward and rearward from a cross-member attached to adjacent row units to a central portion of the row unit. There are drawbacks. This arrangement requires that the stick be stowed somewhere when the divider is lowered into its operating position. In addition, the operator is required to lift the divider by hand, with no assistance. Furthermore, the cross-member between adjacent row units prevents the operator from working on the sides of each row unit.

in another prior art design, a gas shock or extendible spring is used in place of the stick. This advantageously provided spring assistance to lift the cover. There are drawbacks: it still requires the cross-member. Furthermore, when the divider is in its lowered, operating position, the highly tensioned spring is compressed between the steel cross-member and the divider, commonly made of plastic. The spring presses on the plastic when the divider is closed, causing the plastic to tear and therefore the arrangement requires the addition of an additional strut or stiffener that extends from the center of the plastic divider where the spring is attached to the rear of the divider. In this way the load is better distributed over a larger surface area of the plastic divider.

In another prior art design rather than providing a cross-member fixed to and extending between adjacent row units at the front of the row units, the arrangement provides a forwardly extending beam that is cantilevered forward from a cross-member located at the rear of the row units. This forwardly extending beam supports the lower, forward end of a gas shock or spring. The upper end of the spring is attached to a tubular frame member that supports the plastic divider. This design contains the spring tension when dosed within the metal members and does not communicate it to the plastic. However it still requires a member extending forward into the gap between each pair of two adjacent row units. As in the previous example, the forward end of the compression spring is stationary and coupled to the frame.

What is needed, therefore, is a cornhead divider lift assist linkage in which the compression spring does not have a forward end that is stationary and fixed between the row units when the divider is raised. What is also needed is a cornhead divider lift assist linkage that does not apply significant pressure to the plastic divider when the divider is in its lowered operating position. It is an object of this invention to provide such a device in the independent claims of the present application. Further advantages are provided by each of the dependent claims.

SUMMARY OF THE INVENTION

The cornhead divider lift assist linkage is an over-center linkage and includes a first member that is elongated (a first elongated member), a second member, that is in the form of a generally triangular pivoting link, and a compression spring preferably defined as a gas spring or gas shock. The first elongated member extends generally fore-and-aft whenever the divider is in its lowered, operating position. Unlike the cross-members or fore-and-aft extending members of the prior art, the first member is pivotally coupled at its rear end to the corn head at the rear of two adjacent row units. The divider itself is pivotally coupled to the frame of the corn head by a hinge. This hinge defines a pivotal axis that extends laterally and horizontally with respect to the corn head. The pivoting link is pivotally attached at a first end, defined by a first corner, to a rear end of the first member and is attached at a second end, defined by a second corner, to a central underside location of the divider spaced forwardly of the hinge to a location preferably at the middle of the divider. By this arrangement, when the divider is lifted, the first member will pivot upward with the divider to be lifted out of the way and provide the operator substantially full access to the space between the adjacent row units.

A rear end of the spring is connected to the first member at a location adjacent its rear end, and a front end of the is connected to the pivoting link at a point defined by a third corner located rearward of the first corner. The pivoting link is coupled to the first member at a pivot joint, which permits the pivoting link to pivot about a substantially transverse and horizontal pivoting axis with respect to the first elongate member. This pivoting axis is preferably located at the forward end of the first elongate member.

The pivoting link is arranged with respect to the first elongate member such that when the pivoting link pivots in a rearward first direction about its first end with respect to the first elongate member, the distance between the second end of the pivoting link and the rear end of the first elongate member increases.

In a similar fashion, when the pivoting link pivots in a forward second direction about its first end with respect to the first elongate member, the distance between the second end of the pivoting link and the rear end of the first elongate member decreases.

Since the rear end of the first elongate member is pivotally coupled to the frame of the corn head slightly forward of the pivot axis of the hinge, and since the second end of the pivoting link is pivotally coupled to the divider, and since the divider is hinged to pivot about the axis of the hinge, then whenever the divider is lifted, the pivoting link pivots with respect to the first elongate member in the rearward first direction, extending the overall distance measured from the rear end of the first elongate member to the second end of the pivoting link.

The spring is coupled to both the pivoting link and the first elongate member such that the spring is under compression and biases the downwardly when the divider is in its lowered operating position (i.e. the lowered position in which it covers up portions of two adjacent row units). When the divider is lifted, this compression is released and the spring acts to assist in lifting the divider from its operating position to a raised position in which access is provided to the row units previously covered. In one arrangement, the spring compression may be insufficient to lift the divider all by itself. In another arrangement, the spring may be able to supply sufficient force such that when the divider is released from its operating position, the energy stored in the spring is sufficient to raise the divider over substantially all of its entire pivoting range from its lowered operating position to a raised position.

In order to raise the divider, the spring is coupled between the pivoting link and the first elongate member such that the compression in the spring, when released, tends to rotate the pivoting link with respect to the first elongate member in the forward first direction, i.e. in the direction that tends to extend the overall distance between the rear end of the first elongate member and the second corner of the pivoting link.

In a preferred arrangement, the pivot points between the spring, the first elongate member, and the pivoting link may be located with respect to each other such that when the divider to which the elongate member and pivoting link are attached is closed, the force stored in the spring is maintained without the necessity of any external force being applied to the system of spring, elongate member and pivoting link. This condition is preferably generated lowering divider and placing it into its lowered operating position.

To do this, the spring is arranged such that just prior to the divider reaching its lowered operating position, the spring passes over-center through a position of maximum compression, wherein the pivotal connections of the spring with the pivoting link and elongate member are aligned with the pivotal connection of the elongate member with the pivoting link, and when the divider reaches its lowered operating position, the spring has begun to extend slightly from its position of maximum compression, releasing some of its stored energy. In order to lift the divider from its closed and operating position to a raised position, it is therefore necessary to slightly compress the spring until the spring again passes over-center through its position of maximum compression as the divider is lifted. This means, however, that the spring is arranged such that it biases the divider toward its lowered operating position until the divider is raised sufficiently to move the spring over-center whereupon the spring acts to assist the lifting of the divider. In the preferred embodiment, the spring is arranged such that it holds the divider in its lowered operating position without, however, applying any significant force to the divider in this position. In this way, the plastic divider will not be plastically deformed over time by spring forces. To contain the energy in the spring in the lowered operating position, and avoid applying any significant spring force to the divider, a stop is provided that is engaged on at least two of the spring, the pivoting link, and the elongate member with respect to each other.

In accordance with one aspect of the invention, there is provided a corn head divider lift assist linkage for supporting a corn head divider that covers adjacent row units said adjacent row units having front ends and rear ends, the linkage comprising: a first elongate member having first and second ends, wherein said first end of said first elongate member is pivotally coupled to the corn head adjacent to said rear ends of the row units to pivot with respect to the corn head and the two adjacent row units; a pivoting link having first and second ends, wherein the first end of the pivoting link is pivotally coupled to the first end of the first elongate member and the second end of the pivoting link is pivotally coupled to the corn head divider; and a compression spring having first and second ends, wherein the spring is pivotally coupled to the pivoting link at the first end of the spring and is pivotally coupled to the first elongate member at the second end of the spring; wherein the first elongate member, the pivoting link, and the spring are dimensioned such that compression in said spring can be maintained internal to the corn head divider lift assist linkage in a stable state.

The first elongate member, pivoting link and the spring may be pivotable to relative positions of stability in which tension is maintained in said spring without the application of force external to the first elongate member, pivoting link and the spring, by rotating the pivoting link in a first direction with respect to the first elongate member until the spring has been compressed to a state of maximum working compression and then rotating the pivoting link further in the first direction until the spring has decompressed slightly from the state of maximum working compression.

A first member of a corn head divider lift assist linkage may abut a stop on a second member of the cornhead divider lift assist linkage to maintain compression in said spring when the first elongate member, the pivoting link and the spring are in their relative positions of stability.

The first elongate member and the pivoting link may define a distance between the first end of the first elongate member and the second end of the pivoting link, and further wherein the distance continuously increases over substantially an entire range of movement of the corn head divider lift assist linkage as the divider is moved from a lowered operating position to a completely raised position.

The spring may have a total operating range of movement, and the spring may have a position of maximum compression over its total range of operating movement, and the first and second ends of the spring and the first end of the pivoting link may be disposed in a straight line when the spring is at its position of maximum compression.

The corn head lift assist linkage may have a first range of motion that is defined by a first position in which the divider is raised and a second position in which the divider is in a lowered operating position, and the spring may have a position of maximum compression achieved at one point in its operating range of positions, and the position of maximum compression may be achieved when the divider is pivoted slightly above the lowered operating position.

According to another aspect of the invention, a corn head divider lift assist linkage for supporting a corn head divider that covers adjacent row units in which the adjacent row units have front ends and rear ends is provided, wherein the linkage comprises a first member having first and second ends, wherein the first end of said first member is pivotally coupled to the corn head adjacent to said rear ends of the row units to pivot with respect to the corn head and the two adjacent row units; a second member having first and second ends, wherein the first end of the second member is pivotally coupled to the first member and the second end of the second member is pivotally coupled to the corn head divider; and a compression spring having first and second ends, wherein the spring is pivotally coupled to the second member at the first end of the spring and is pivotally coupled to the first member at the second end of the spring; wherein the first member, the second member and the spring are dimensioned such that compression in said spring can be maintained internal to the corn head divider lift assist linkage in a stable state.

The first member, second member and the spring may be pivotable to relative positions of stability in which tension is maintained in said spring without the application of force external to the first member, second member and the spring, by rotating the second member in a first direction with respect to the first member until the spring has been compressed to a state of maximum working compression and then rotating the second member further in the first direction until the spring has decompressed slightly from the state of maximum working compression.

A first one of the first member, second member and the spring may abut a stop on a second one of the first member, second member and the spring to maintain tension in said spring when the first member, second member and the spring are in their relative positions of stability.

The first member and the second member may define a distance between the first end of the first member and the second end of the second member, and the distance may continuously increases over substantially an entire range of movement of the corn head divider lift assist linkage as the divider is moved from a lowered operating position to a completely raised position.

The spring may have a total operating range of movement, and the spring may have a position of maximum compression over its total range of operating movement, and the first and second ends of the spring and the first end of the second member may be disposed in a straight line when the spring is at its position of maximum compression.

The corn head lift assist linkage may have to first range of motion that is defined by a first position in which the divider is raised and a second position in which the divider is in a lowered operating position, and the spring may have a position of maximum compression achieved at one point in its operating range of positions, and the position of maximum compression may be achieved when the divider is pivoted slightly above the lowered operating position.

In accordance with another aspect of the invention, a corn head is provided having a laterally extending frame and a plurality of row units mounted thereon wherein the row units are substantially covered by a plurality of dividers supported by the corn head divider lift assist linkages of any of the above-described configurations.

In accordance with another aspect of the invention, a corn head divider lift assist linkage is provided, that comprises two members and a spring pivotally coupled together, wherein one of the two members is pivotally coupled to a row crop divider and another of the two members is pivotally coupled to a bracket that is fixed at the rear of two adjacent row units.

The two members and the spring may be coupled together to define three pivotal joints, a first of the joints being between one end of the spring and a rear location of the first member second of the joints being between the front end of the first member and a first end of the second member, and the third joint being between a second end of the spring and a point of said second member located behind the second joint.

The distance between the first and second joints is fixed and the distance between the first and third joints varies as the divider is pivoted over its range of motion from a lowered operating position to a raised position.

DETAILED DESCRIPTION OF THE PREFERRED EMBODIMENTS

Figure 1:
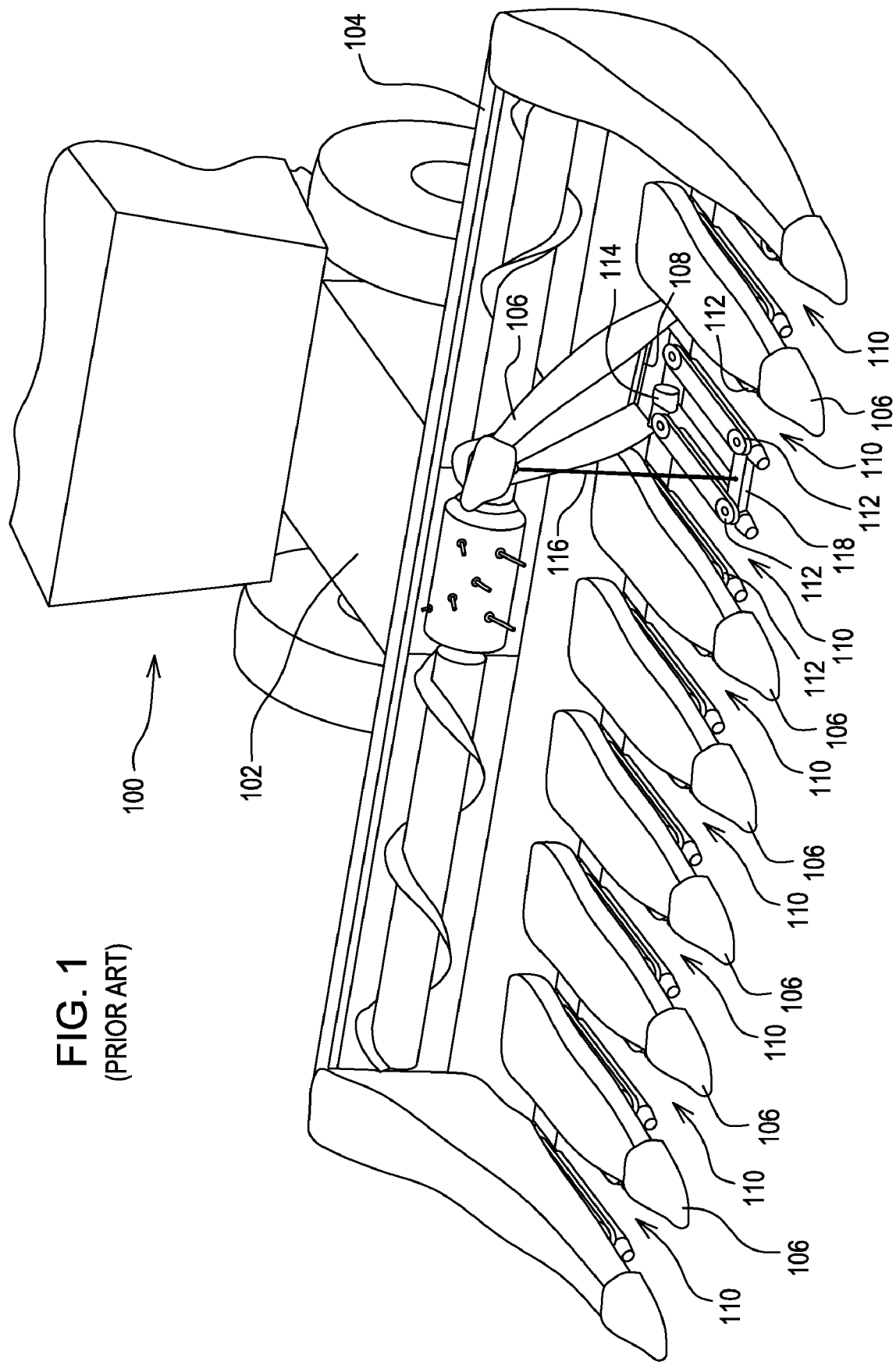
FIG. 1 shows an agricultural combine with a corn head having a prior art corn head divider lift assist linkage.

Referring now to FIG. 1, a typical agricultural combine 100 is shown supporting a corn head 104 on a feederhouse 102 that extends forward from the agricultural combine 100.

This corn head has a plurality of dividers 106 supported on hinges 108 that constrain the dividers 106 to pivot upward into a maintenance position (shown adjacent leftmost divider 106) and pivot downward into a lowered operating position (shown by the remaining dividers 106).

When the dividers are in the lowered positions, rows of corn plants are directed by the dividers into gaps 110 that are formed between adjacent stalk rolls 112 of row units 114.

In one common prior art arrangement shown in FIG. 1, the operator unlatches the divider and raises it by its front end until it is in the position indicated in FIG. 1. The operator then inserts a supporting member 116, here shown as a simple prop, between the forward end of the divider 106 and a cross-member 118. The cross-member 118 is typically a metal bracket or strap that is bolted to two adjacent row units, extending across the gap between them. As can be seen in FIG. 1, this arrangement makes it difficult for the operator to work on the row units. The operator cannot easily get in between two adjacent row units with the cross-member 118 and supporting member 116 in the way.

Figure 2:
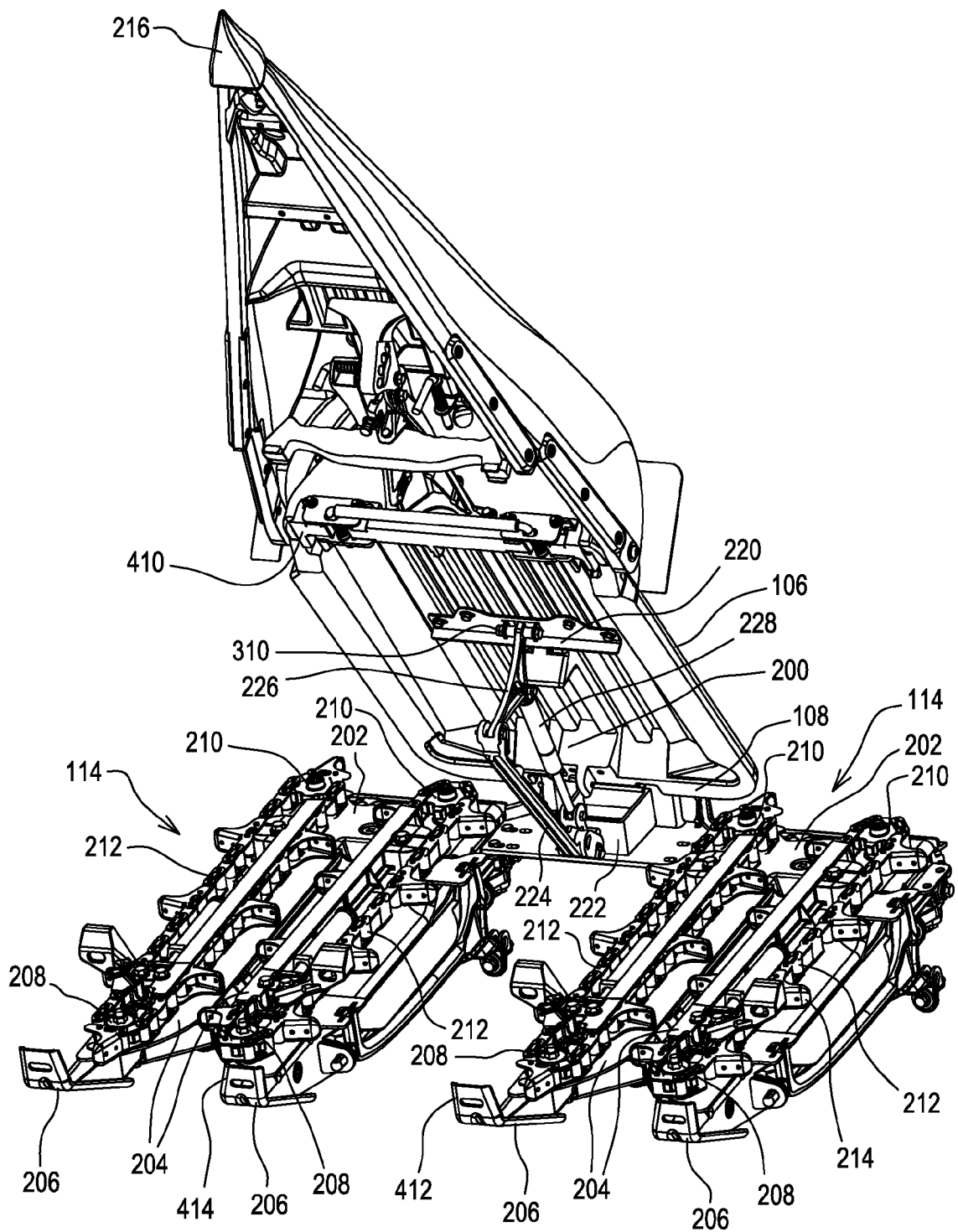
FIG. 2 shows the interrelationship of two adjacent row units and a divider supported by the corn head divider lift assist linkage of the present invention.

For that reason, the applicants have proposed a corn head divider lift assist linkage such as that illustrated in FIG. 2. FIG. 2 shows an alternative corn head divider lift assist linkage 200 that the applicants propose to be used in place of the divider support shown in the prior art references mentioned above, and in place of the arrangement shown in FIG. 1.

Two adjacent row units 114 include on a row unit gearbox 202 that drives to forwardly extending and generally horizontal stalk rolls that are disposed immediately below and parallel with deck plates 204 on each row unit 114. The two deck plates 204 of each row unit define a gap therebetween that receives a row of corn plants. Each row unit 114 also includes two forwardly extending row unit arms 206 that support idler gears 208. Two drive gears 210 extend upward from the row unit gearbox 202 and are driven by the row unit gearbox 202. Gathering chains 212 are driven by drive gears 210 in a direction that causes lugs 214 extending from the gathering chains 212 to push the cornstalks rearward between adjacent deck plates 204 of each row unit 114.

Divider 106, when lowered, covers the two inside row unit arms 206 and the inner portions of gathering chains 212, leaving the deck plates exposed to receive the cornstalks. Plant material that abuts the divider slides to either side of the forwardmost point 216 of the divider until it reaches the deck plates 204. At which time the stalk rolls (hidden under the deck plates in this view) engage the plant stalk together with the lugs 214 to pull plant stalk further into the gap defined between the deck plates and row unit arms.

Divider 106 is made of plastic, preferably rotomolded. The preferred plastic is a high molecular weight thermoplastic such as polyethylene or polypropylene. A first bracket 220 is bolted to the underside plastic surface of divider 106 to provide a convenient mounting point for the front and upper end of corn head divider lift assist linkage 200.

Similarly, a second bracket 222 that is fixed with respect to the corn head frame (either directly fixed to the frame or indirectly fixed to the frame by being fixed to one or both of row units 114 as shown here or to another intermediate structure). Second bracket 222 provides a convenient mounting point for the rear (and lower) end of corn head divider lift assist linkage 200.

Corn head divider lift assist linkage 200 is an over-center linkage and includes a first elongate member 224, a second member in the form of a generally triangular pivoting link 226, and a spring 228. A rear end of first elongate member 224 is pivotally connected to second bracket 222. A front end of first elongate member 224 is pivotally connected to a first end or corner of the pivoting link 226. A second end or corner of pivoting link 226 is pivotally coupled divider 106, preferably, and as shown here, by being pivotally coupled to first bracket 220. Spring 228, here shown in its preferred embodiment as a compression spring defined by a telescopic gas spring or gas shock, is coupled between the rear end of first elongate member 224 and a point of the pivoting link 226 defined by a third corner located approximately midway between the first and second ends of the pivoting link.

In particular, a first end of spring 228 is pivotally coupled to pivoting link 226 at a point generally between the first and second ends of link 226. A second end of spring 228 is pivotally coupled to a rear location of first elongate member 224. Spring 228 is a compression spring, which is compressed by bringing its opposing ends closer together. When compressed, the two ends of spring 228 release theft stored enemy by increasing the length of spring 228. In the arrangement shown in FIG. 2, when spring 228 increases its length, it acts through pivoting link 226 to push upward on bracket 220, the link 226 rotating in a counterclockwise direction (in FIG. 2) about its pivotal connection with the first elongate member 224 and rotating divider 106 in a clockwise direction about hinge 108. Hinge 108 is disposed behind (i.e., to the rear of) the rear end of first elongate member 224. Thus, the force applied by spring 228 is communicated to the pivoting link 226 along a straight line, defined by the axis of the spring 228, and then through the link 226 to the first bracket 220. Since the connections to bracket 220 and to bracket 222 are pivoting connections, the entire corn head divider lift assist linkage lifts upwards and out of the operator's way as spring 228 lifts divider 106.

When divider 106 is fully lifted (it is only half lifted in FIG. 2) almost the entire space between the adjacent row unit arms 206 of adjacent row units is clear, permitting the operator to enter this space between the adjacent row units and perform periodic maintenance and repairs.

Figure 3:
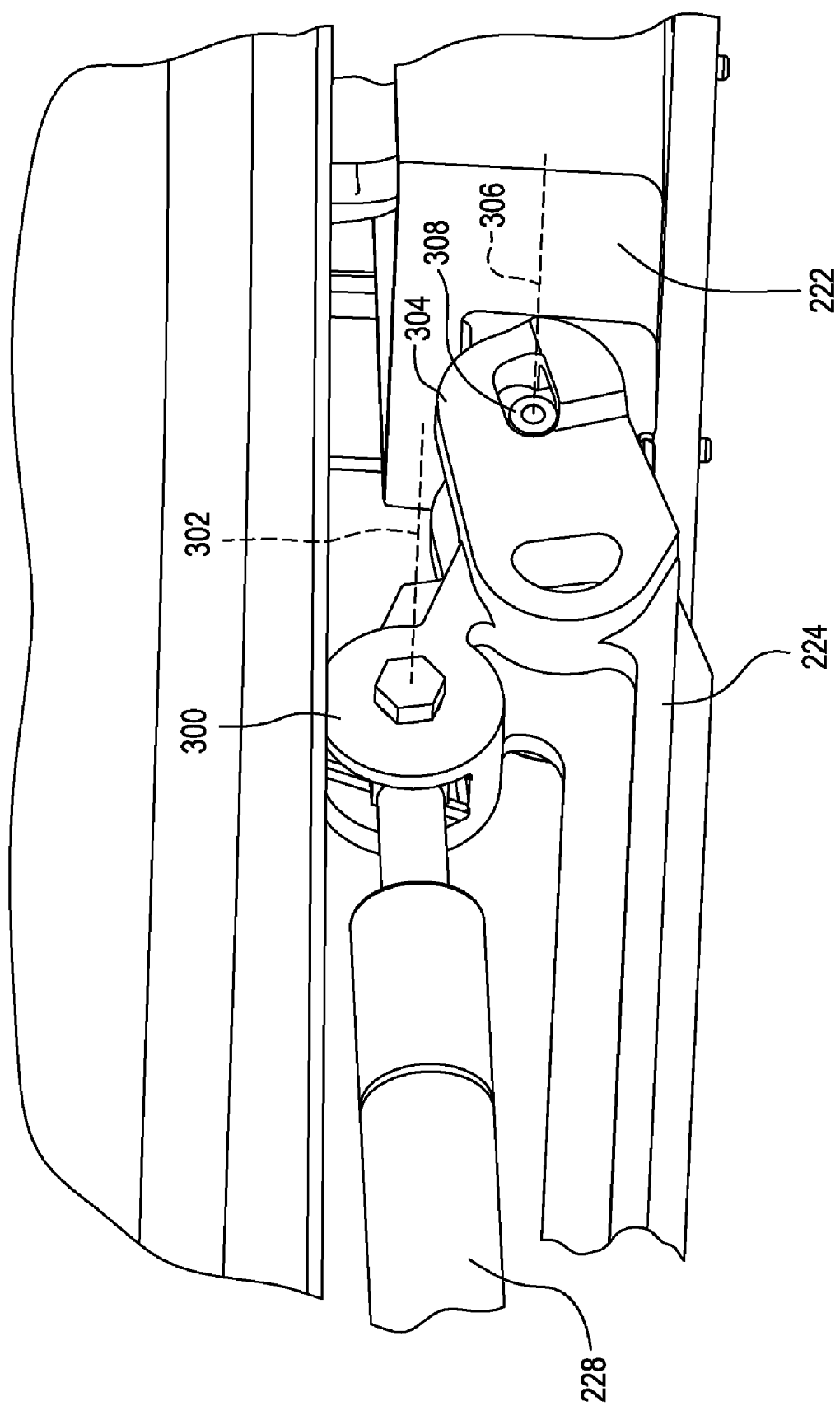
FIG. 3 is a close-up view of the rear end of the first elongate member of the corn head divider lift assist linkage of FIG. 2.

Referring now to FIG. 3 details of the rear end of first elongate member 224 are shown. In particular, a pivot joint 300 defined between spring 228 and first elongate member 224 is shown. It constrains the spring 223 and the first elongate member 224 to pivot with respect to each other about laterally and horizontally extending pivotal axis 302. Similarly, a pivot joint 304 at couples first elongate member 224 and the bracket 222 and constrains first elongate member 224 to pivot with respect to bracket 222 about a laterally and horizontally extending axis 306. By removing a pin 308 that defines pivot axis 306 of joint 304, and removing pivot pin 310 (FIG. 2) that connects pivot member 226 to bracket 220, the operator can completely remove the corn head divider lift assist linkage 200 from the corn head.

Figure 4:
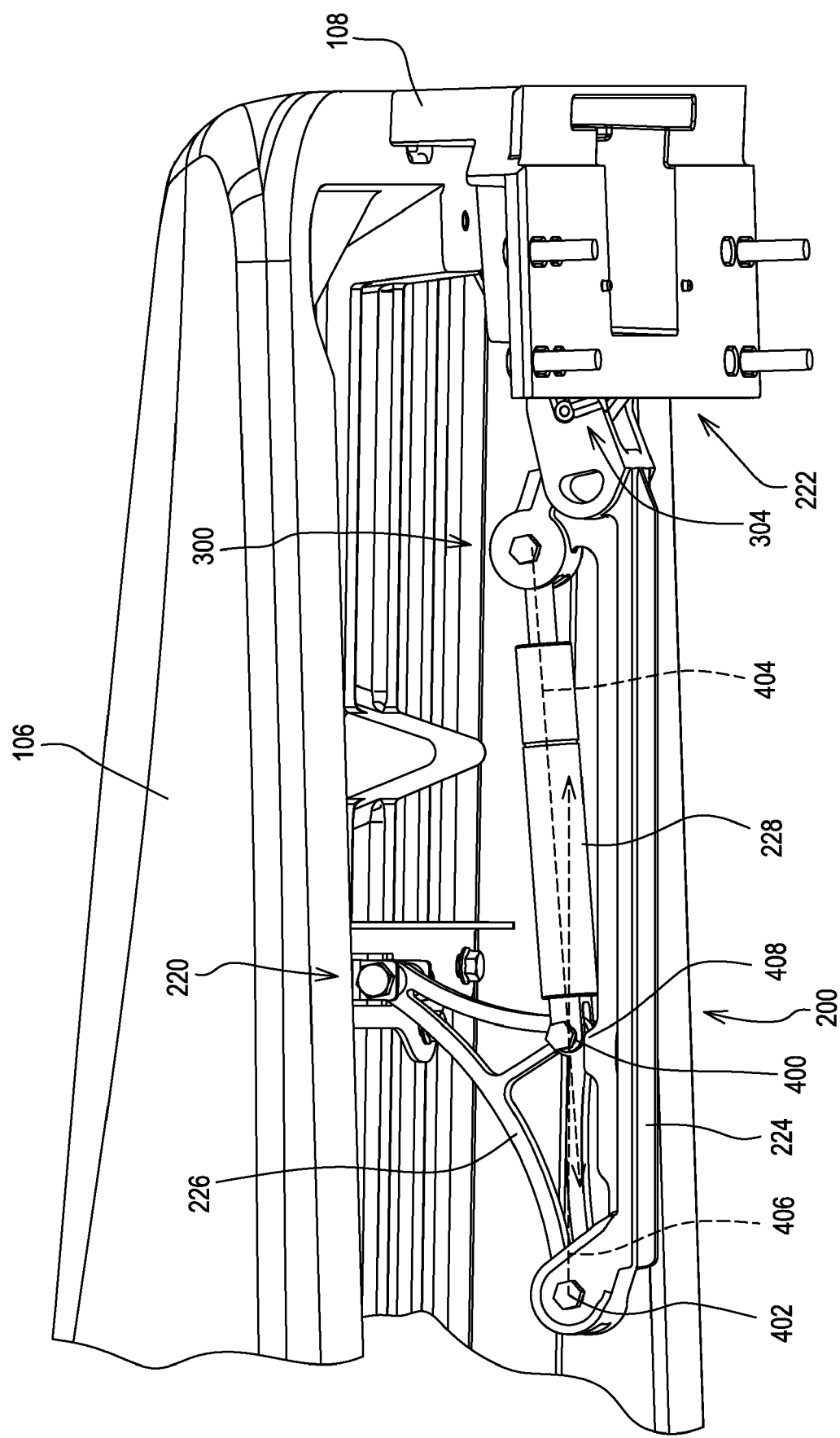
FIG. 4 is a side view of the divider shown in FIGS. 2 and 3 in the lowered and closed position illustrating the corn head divider lift assist linkage of the foregoing FIGS. 2 and 3 in its fully closed position in which the spring is had in its compressed state by the other elements of the corn head divider lift assist linkage.

Referring now to FIG. 4, divider 106 and corn head divider lift assist linkage 200 can be seen in their relative positions with respect to brackets 222 and 220 when divider 106 is in its lowered operating position.

In order to lower and close divider 106, the corn head divider lift assist linkage 200 has to go from the position shown in FIG. 2, to the position shown in FIG. 4. In this process, spring 228 is gradually compressed as pivoting link 226 rotates rearward or clockwise (in both FIGS. 2 and 4) with respect to first elongate member 224. Eventually, spring 228 reaches a point of maximum compression. This point occurs when the pivot joint 400 defining the connection between spring 228 and pivoting link 226 is disposed along a line of centers extending between pivot joint 402 and pivot joint 300. Pivot joint 402 defines the pivoting connection between pivoting link 226 and first elongate member 224.

In this position of maximum compression, spring 228 is unstable. It can either extend by rotating pivoting link 226 counterclockwise about the pivot joint 402 by lifting divider 106, or it can extend by rotating pivoting link 226 clockwise about the joint 402 by lowering the divider 106. The position shown in FIG. 4, however, is the closed position of the corn head divider lift assist linkage, which is beyond this unstable position of maximum compression of spring 228. The line of force passing through spring 228 is shown by dashed line 404. The opposing lines of force passing through pivoting link 226 is shown by dashed line 406 if the corn head divider lift assist linkage was in the on-center position of maximum compression of spring 228, these two lines would be collinear. They are not. Spring 228 has passed over-center through the on-center position of maximum compression in a downward direction, and is now slightly extended. Spring 228 has traveled downward so far that it abuts mechanical stop 408. Mechanical stop 408 prevents spring 226 from rotating any further counterclockwise (as shown in FIG. 4). Spring 228 is still under significant, almost maximum, compression and therefore exerts a significant force along line 404, which passes below pivot joint 402, resulting in the pivoting link 226 being urged with a much smaller force downward against mechanical stop 408. In this position spring 228 is trapped, and all of the spring forces are retained within the corn head divider lift assist linkage. The corn head divider lift assist linkage 200 can be removed from bracket 220 and bracket 222 and the spring 228 will remain in this compressed position.

In this position, a slight manual upward force on divider 106 will be sufficient to lift spring 228 through the on-center position of maximum compression, at which point the spring's natural tendency to extend from its compressed to its relaxed state will cause it to automatically lift the divider 108. Alternatively, if spring 228 is selected to store less energy, spring 228 will not lift divider 106 on its own, but will provide assistance to the operator when the operator lifts divider 106. The amount of assistance can be varied by choosing a spring 228 with the appropriate spring constant.

Once the divider 106 is in the closed and operating position shown in FIG. 4, the operator can engage a latch 410 (FIG. 2) to lock the divider 106 in its closed and operating position. In this case, latch 410 connects the middle of divider 106 to mating latch elements 412, 414 on the two adjacent row unit arms 206 (see FIG. 2) to thereby hold the forward end of divider 108 down. This latching is of particular advantage when the corn head divider lift assist linkage 200 is as shown in FIG. 4, in which only a small upward force applied to divider 106 is required to lift spring 228 to its on-center maximum compression position. Once at or slightly above its on-center maximum compression position, spring 228 could abruptly and inadvertently lift divider 106 into its raised (FIG. 2) position. In this position, the operator must immediately stop harvesting, climb out of the cab of the agricultural combine, and push the divider 106 back down into its lowered closed and operating position.

In the arrangement of FIG. 4, mechanical stop 408 is a place on the upper surface of first elongate member 224 that abuts cylinder 228 and prevents it from rotating further counterclockwise, it should be clear that the stop could as easily be disposed to but pivoting link 226, preventing it from rotating further in the clockwise direction. Alternatively, the stop could as easily be disposed on either pivoting link member 226 or spring 228 such that the stop prevents further relative downward movement of pivoting link 226 with respect to spring 228.

In FIG. 4, the three members that comprise the corn head divider lift assist linkage 200 are arranged in a stable over-center condition wherein the three joints that couple the three elements together to form the cornhead divider lift linkage are located such that the spring 228 acts along a line 404 that passes through the two joints respectively coupling the spring to a rear location of the first member 224 and midpoint of the pivoting link 226 and just beneath the joint that couples the front end of the first member 224 to an end of the pivoting link 226.

When the spring reaches its position of maximum compression, the three joints that define the couplings between the three members are aligned in a straight line and therefore are on-center. In the embodiment of FIG. 4, the divider has been lowered below that position wherein the three joints are in a straight line arrangement to a self locking position in which the joint between the spring and the pivoting link no longer lies on a line with the joint between the spring and the first elongate member, and the joint between the first elongate member and the pivoting link. The three joints form a triangular relation, with the joint between the spring and the pivoting link being the lowermost joint of the three, and thus the lowest vertex of the triangle.

It should be understood that the particular embodiments shown and discussed herein are not the only ways in which the invention can exist. They are merely a current preferred embodiment of the invention. One skilled in the art of corn head design and manufacture can readily see other variations that would also fall within the scope of the appended claims.

We claim:

1. A corn head divider lift assist linkage adapted for supporting a corn head divider that covers adjacent row units having front ends and rear ends and the cover being connected at its rear end for pivoting vertically about a horizontal transverse axis located adjacent rear ends of the row units, the linkage, as considered in an orientation for being mounted for use, comprising:
   a fore-and-aft extending first elongate member having first and second ends, wherein said first end of said first elongate member is adapted for being pivotally coupled to the corn head adjacent to said rear ends of the row units to pivot vertically with respect to the corn head and the two adjacent row units;
   a pivoting link having first and second ends, wherein the first end of the pivoting link is pivotally coupled at a first joint to the second end of the first elongate member and the second end of the pivoting link is adapted for being pivotally coupled to the corn head divider at a central underside location spaced forwardly from said transverse axis; and
   a compression spring having first and second ends, wherein the first end of the spring is pivotally coupled to the pivoting link at a second joint located between said first and second ends of the pivoting link, and wherein the second end of the spring and is pivotally coupled to the first elongate member at a third joint located adjacent the first end of the elongate member;
   wherein the first elongate member, the pivoting link, and the spring are dimensioned such that compression in said spring can be maintained internal to the corn head divider lift assist linkage in a stable state with the spring acting along a line passing below the first joint.

2. The corn head divider lift assist linkage of claim 1, wherein the first elongate member, pivoting link and the spring are pivotable, to relative positions of stability in which compression is maintained in said spring without the application of force external to the first elongate member, pivoting link and the spring, by rotating the pivoting link in a first direction with respect to the first elongate member until the spring has been compressed to a state of maximum working compression, wherein the first, second and third joints are cloned with each other, and then rotating the pivoting link further in the first direction until the spring moves over-center and has decompressed slightly from the state of maximum working compression, this being said stable state.

3. The corn head divider lift assist linkage of claim 2 wherein one of said first elongate member, pivoting link and spring abuts a stop on another of said first elongate member, pivoting link and spring to maintain compression in said spring when said spring has moved slightly over-center so as to be in said stable state wherein it has decompressed slightly from the state of maximum working compression.

4. The corn head divider lift assist linkage of claim 1, wherein the first elongate member, pivoting link and spring are so dimensioned and arranged relative to each other that a distance between the first end of the first elongate member and the second end of the pivoting link continuously increases over substantially an entire range of movement of the corn head divider lift assist linkage as the pivoting link and spring are pivoted upwardly relative to the first elongate member.

5. The corn heed divider lift assist linkage of claim 1, wherein the stable state of the corn head lift assist linkage corresponds to that in which the divider, with which the lift assist linkage is adapted for use, is in a lowered operating position, with said pivoting link then being positioned such that the entire pivoting link extends in rearward overlapping relationship to the elongate first member, with the pivoting link and spring being so located relative to each other that the spring has a position of maximum compression achieved at one point in its operating range of positions by rotating the pivoting rearward about said first joint.

6. A corn head having a laterally extending frame and a plurality of row units mounted thereon wherein the row units are shielded by a plurality of dividers supported by the corn head divider lift assist linkages of claim 1.

7. A corn head divider lift assist linkage comprising: first and second members and a compression spring pivotally coupled together, wherein the first member has a first end adapted for being pivotally coupled to a fixed location adjacent a divider hinge; the second member has three attaching points disposed in a triangular array, with a first attaching point being coupled to one end of the first member, with a second attaching point being adapted for attachment to a corn head divider and with a third point being located generally midway between the first and second points and being pivotally attached to one end of the spring; and the spring having a second end pivotally connected to the first member at a location adjacent the first end of the first member.

8. The corn head divider assist linkage of claim 7, wherein the first and second members and the spring as coupled together define three pivotal joints, a first of which is between the first member and the second member, with the second member being rotatable about the first joint among various positions, one of which is an on-center position wherein the compression spring is fully compressed, with second and third ones of the three joints being at the opposite ends of the spring and aligned with said first one of the joints.

9. The corn head divider lift assist linkage of claim 8, wherein the spring varies in length as the second member is rotated one way or another from its on-center position.

* * * * *